April 30, 1963  F. ROTTMAYR  3,087,310
PROCESS FOR THE PRODUCTION OF ACETYLENE-FREE ETHYLENE
Filed Dec. 11, 1959  2 Sheets-Sheet 2

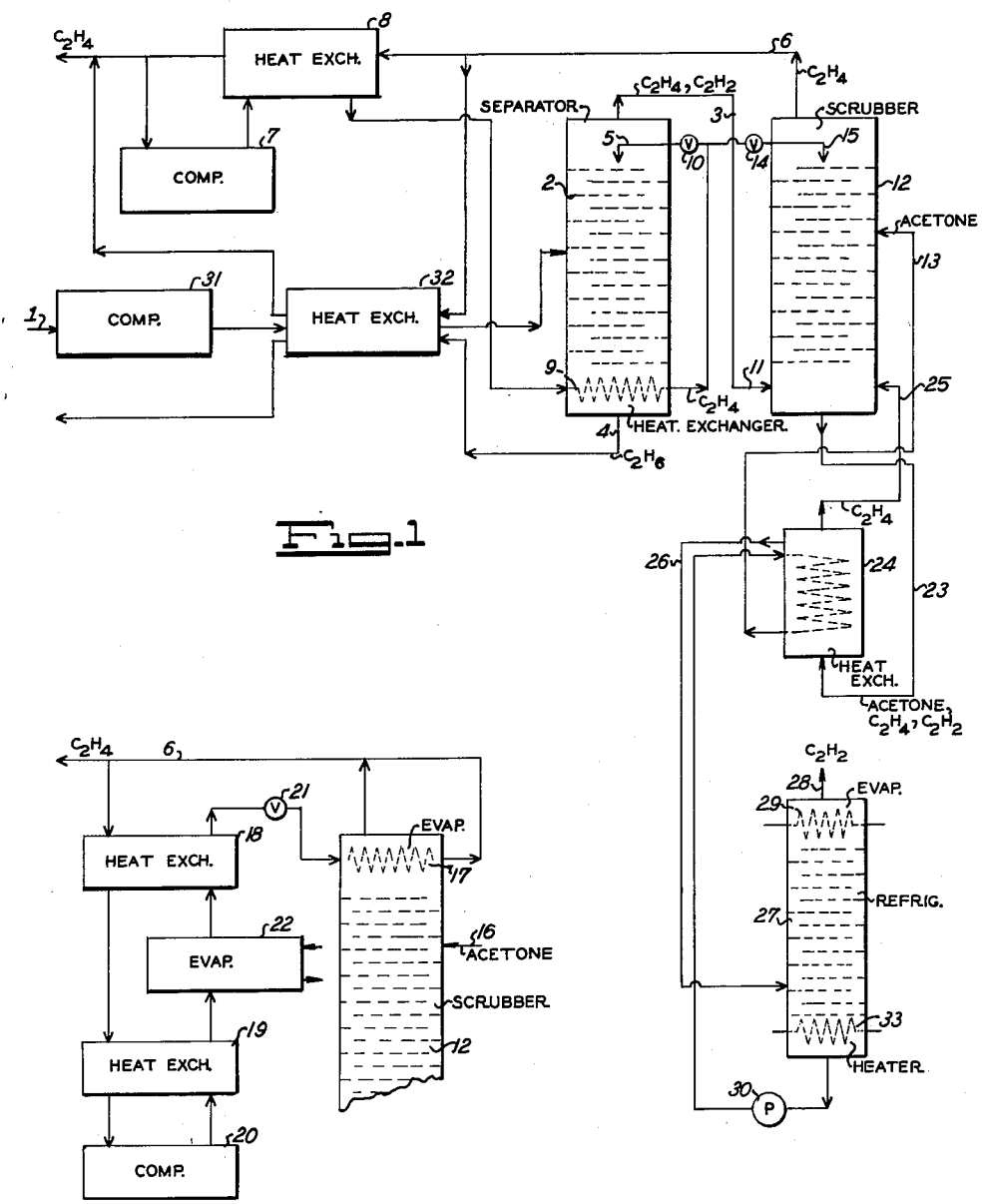

3,087,310
PROCESS FOR THE PRODUCTION OF
ACETYLENE-FREE ETHYLENE
Friedrich Rottmayr, Hollriegelskreuth, Germany, assignor to Gesellschaft fuer Linde's Eismaschinen Aktiengesellschaft, Hollriegelskreuth, near Munich, Germany
Filed Dec. 11, 1959, Ser. No. 858,953
14 Claims. (Cl. 62—17)

This invention relates to processes for the production of acetylene-free ethylene from gas mixtures which, in addition to acetylene and ethylene, contain further low aliphatic hydrocarbons such as methane, ethane and $C_3$ hydrocarbons. Such gas mixtures are, for example, coke-oven gas, cracking gas or crude ethylene.

This application is a continuation-in-part of my co-pending application Serial No. 580,327, filed April 24, 1956, now abandoned.

It is conventional to compress these gas mixtures, cool them in countercurrent with cold decomposition products and to liquefy them at least partially, and then decompose the liquefied fractions by rectification. In a first decomposition state, the hydrocarbons with three and more C atoms are separated out and the methane and other constituents such as $H_2$ and $N_2$ which are liquefied only with difficulty are separated in a second stage. Then, the acetylene-containing ethylene-ethane mixture must be separated in a third stage. According to the origin of the starting gas, this latter mixture contains from a few tenths to approximately 2% of acetylene. Since acetylene forms azeotropically boiling solutions both with ethylene and also with ethane, it is not possible to obtain acetylene-free ethylene merely by rectification.

A method has already been proposed involving scrubbing acetylene from coke-oven gas and similar gas mixtures by means of acetone or another selective solvent for acetylene with a low freezing point such as, for example, ammonia or sulphur dioxide, at temperatures of between —60 and —90° C., before the gas mixture is subjected to the actual decomposition process. Although acetylene-free ethylene can be obtained by this process, it is necessary to scrub the whole gas mixture. Therefore, a comparatively large quantity of solvent is required and the scrubbing apparatus is complicated. The solvent vapors which are drawn out from the scrubbing apparatus by the gas mixture disturb the decomposition operations in the following stages if they are not removed by special means immediately after scrubbing.

It is also conventional to scrub out all the hydrocarbon compounds jointly at a low temperature from electric arc acetylene and to rectify the charged scrubbing liquid. Here again, there is the disadvantage that the whole of the gas mixture has to be scrubbed.

Since, with these known processes, other gas constituents as well as acetylene are scrubbed out with the acetylene according to their partial pressures, regeneration of the scrubbing medium is complicated.

It is also conventional to absorb acetylene chemically from its mixture with ethylene, or to hydrate acetylene in order to make it possible to produce very pure ethylene.

In contradistinction to the above methods, with processes of the invention, extremely pure ethylene can be obtained by purely physical methods with a minimum amount of solvent. According to the invention, the acetylene is scrubbed out of the gaseous acetylene-ethylene-ethane mixture obtained during the course of the decomposition process, at or slightly above the liquefaction temperature thereof, and then the ethylene-ethane mixture which is produced is rectified. Ethylene does not form an azeotropically boiling solution with ethane so that both substances can easily be separated. In one embodiment of the underlying idea of the invention, the ethane is first separated from the acetylene-ethylene-ethane mixture by rectification, whereupon the acetylene is scrubbed out from the acetylene-ethylene mixture obtained, at or slightly above the liquefaction temperature thereof.

Extremely pure ethylene can be produced, according to the invention, so as to contain only a few parts of acetylene in a million; acetylene traces, which could disturb further processing of the ethylene, are no longer present, and this is very valuable for chemical after-treatment. The process can be interpolated easily in the operations of decomposing the gas mixture, since the washing operation proceeds in approximately the same temperature range as that in which rectification is carried out. Therefore, the additional apparatus required for the washing and the energy expenditure are not of significance. At, or slightly above, the liquefaction temperature of the acetylene-ethylene-ethane mixture or the acetylene-ethylene mixture, the solubility relations of acetylene in acetone and ethylene in acetone have a particularly advantageous value for the scrubbing operation. Therefore it is possible to wash with a minimum quantity of scrubbing medium and correspondingly small losses of ethylene. The same applies to other known solvents which are selective with respect to acetylene, such as alcohols, amines or esters of lower organic acids.

If pure acetone or another of the above indicated solvents is added to the mixture which is to be scrubbed, the solvent is heated since it becomes saturated with the individual constituents of the mixture, i.e. more particularly with ethylene, or ethylene and ethane. The increase in temperature caused by the heat of the solution disturbs the scrubbing operation.

According to the invention, therefore, the acetylene is scrubbed out by means of a solution of liquid ethylene and a solvent for acetylene such as, for example, acetone. An apparatus for the process in which acetylene is scrubbed out from the acetylene-ethylene-ethane mixture, and then the ethylene-ethane mixture is rectified, consists primarily of a scrubbing tower in which the acetylene is scrubbed from the acetylene-ethylene-ethane mixture, of a rectification column in which ethylene and ethane are separated, and of a regeneration column for the scrubbing medium which is charged with acetylene. An apparatus for the modified form of the process according to the invention in which ethane is separated from the acetylene-ethane-ethane mixture by rectification, whereupon the acetylene is scrubbed from the acetylene-ethylene mixture obtained, is characterized by the combination of a rectification column, in which ethane is separated from the acetylene-ethylene-ethane mixture, a scrubbing tower in which acetylene is scrubbed from the remaining acetylene-ethylene mixture, and a regeneration column for the washing medium charged with acetylene. At the head of the scrubbing tower, an evaporator of a refrigerating machine may be arranged by which ethylene or ethylene-ethane mixture which forms the scrubbing liquid together with acetone is liquefied.

A description will now be given of the process according to the invention wherein the ethane is first of all separated by rectification from the acetylene-ethylene-ethane mixture, whereupon the acetylene is scrubbed out from the acetylene-ethylene mixture obtained, at, or slightly above, the liquefaction temperature thereof with an acetone-ethylene solution.

For a better understanding of the invention, and to show how the same is to be carried into effect, reference will now be made to the accompanying drawings, in which:

FIGURE 1 shows diagrammatically one constructional form of apparatus for the production of acetylene-free ethylene from a gas mixture containing low aliphatic hydrocarbons;

FIGURE 2 shows diagrammatically a detail of a modifiied form of the structure of FIGURE 1;

Figure 3:
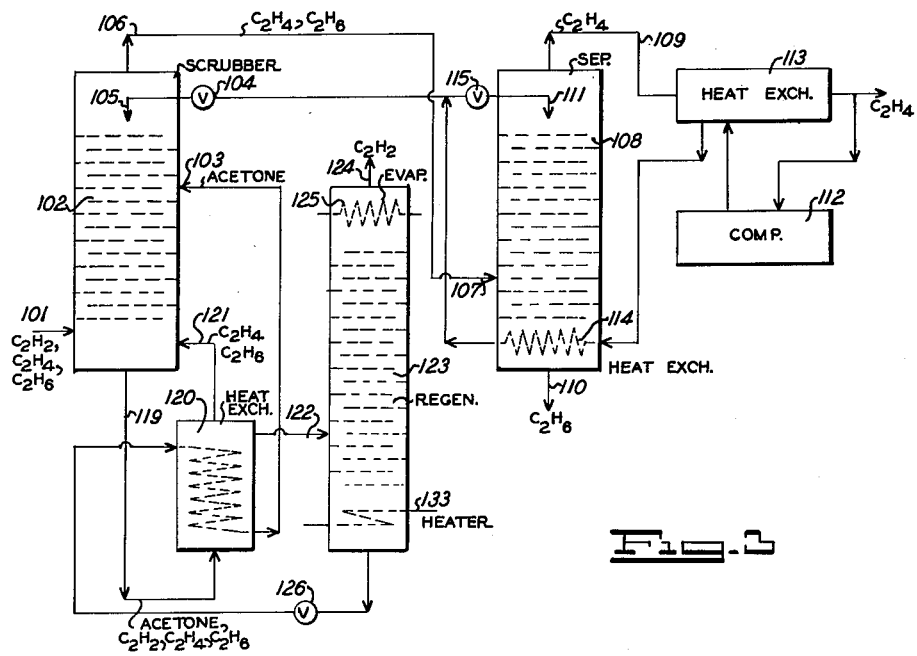
FIGURE 3 shows diagrammatically a further form of apparatus for the production of acetylene-free ethylene from a gas mixture containing low aliphatic hydrocarbons.

Referring firstly to FIGURE 1, liquid ethylene is supplied to the head of a scrubbing tower.

The $C_3$ and higher hydrocarbons are separated in a first stage after the compression of the mixture and on cooling thereof in counter-current with its decomposition products, from a crude ethylene comprising, for example, 40% $CH_4$, 52% $C_2$ and 8% $C_3$ and higher hydrocarbons. Methane is separated in a second stage. The remaining $C_2H_2$—$C_2H_4$—$C_2H_6$ mixture passes from a pipe 1 through a compressor 31 and a heat exchanger 32, at a temperature slightly above its liquefaction temperature, into a separating column 2 in which the mixture is decomposed into a gaseous $C_2H_2$—$C_2H_4$ mixture which is drawn off through a pipe 3, and liquid $C_2H_6$ which is discharged through a pipe 4. At the head of the separating column 2, liquid $C_2H_4$ is fed in by pipe 5 as a scrubbing liquid, which has been taken as a decomposition product from a pipe 6, compressed in a compressor 7, cooled in a heat-exchanger 8 in counter-current with itself, liquefied in a heat-exchanger 9 at the bottom of separating column 2, and expanded in a valve 10. The gaseous $C_2H_2$—$C_2H_4$ mixture drawn off through the pipe 3 flows into a scrubbing tower 12 at inlet 11.

Acetone which is pre-cooled to the scrubbing temperature enters the scrubbing tower 12 at inlet 13, arranged several trays below the topmost tray, and is dissolved in liquid ethylene which has been expanded in a valve 14 and supplied via pipe 15 to the head of the scrubbing tower 12. The scrubbing solution is formed in the scrubbing tower. The mixing heat liberated in this operation is relatively unimportant and is compensated for by the fact that a small quantity of $C_2H_4$ is evaporated. Therefore, the heat of the mixture does not disturb the scrubbing operation taking place on the trays below inlet 13. The temperature drop can spontaneously assume there the most advantageous course for the scrubbing operation. The $C_2H_2$ is scrubbed out at the liquefaction temperature of the $C_2H_2$—$C_2H_4$ mixture determined by the scrubbing tower pressure. On the trays situated above inlet 13, gaseous acetone carried along by $C_2H_4$ is scrubbed out and conveyed downwards into the actual scrubbing tower. The purified $C_2H_4$ leaves the scrubbing tower 12 through the pipe 6 and is taken from the decomposition apparatus as a finished product by way of cold exchangers.

In the manner of operating according to FIGURE 2, ethylene is liquefied with the help of an extraneous cold source from the scrubbed gas mixture in the head of the scribbing tower itself.

Liquid ethylene is formed by an evaporator 17 from the scrubbed gas in the head of the scrubbing tower 12. The evaporator 17 belongs to a compression refrigerating circuit operated with $C_2H_4$ but which, of course, can be operated with other refrigerating means. The refrigerant $C_2H_4$ is taken from the pipe 6 through which the pure $C_2H_4$ which is produced leaves the scrubbing tower 12. The refrigerant flows in counter-current to itself through two heat-exchangers 18 and 19, is compressed in a compressor 20, additionally cooled by means of an evaporator 22, which is situated in the circuit of a refrigerating machine (not shown) which is operated, for example, with ammonia, and is expanded from a valve 21 into the evaporator 17. The liquefied $C_2H_4$ liquefied from the scrubbed gas flows over the topmost trays of the scrubbing tower 12, scrubbing out, as it does so, the acetone vapors entrained by the scrubbed gas, and is mixed with acetone at the acetone inlet point 16. Then, with this solution of acetone and liquid $C_2H_4$, the $C_2H_2$ is scrubbed from the $C_2H_2$—$C_2H_4$ mixture on the trays below the inlet point 16 in the scrubbing tower 12. The scrubbing operation constitutes an extractive rectification. When the $C_2H_2$ is dissolved in the scrubbing solution, heat is produced which is compensated for by the fact that a corresponding quantity of $C_2H_4$ is evaporated from the solution.

The manner in which the cold scrubbing solution that is charged with $C_2H_4$ collects at the bottom of the scrubbing tower 12 and flows out through pipe 23 is regenerated is common to the two methods of operation illustrated in FIGURES 1 and 2. This solution flows in counter-current to warm, regenerated acetone through a heat-exchanger 24, where the $C_2H_4$ dissolved in the solution is liberated except for the proportion which is still soluble at the outlet temperature, and travels back through a pipe 25 to the bottom of the scrubbing tower. The acetone still charged with $C_2H_2$ and a small quantity of $C_2H_4$ passes through a pipe 26 into a regeneration column 27 provided at its base with a heating spiral 33 through which hot steam is arranged to flow. In this column, the dissolved $C_2H_2$ and the residual $C_2H_4$ are driven out and leave the column 27 through a pipe 28, after acetone vapors have been condensed out with the help of an evaporator 29 which belongs to a separate refrigerating circuit (not shown). The regenerated acetone collecting at the foot of the regeneration column 27 is delivered by means of the circulating pump 30, through the heat-exchanger 24 where it is cooled, into the scrubbing tower 12 at 13 or 16 as appropriate.

The temperature at which the gas mixture which enters the scrubbing tower 12 at 11 is scrubbed depends on the pressure at which scrubbing is carried out, and on the composition of the gas. However, the scrubbing should always be carried out at, or slightly above, the liquefaction temperature of the mixture.

In FIGURE 3 the $C_2H_2$—$C_2H_4$—$C_2H_6$ mixture passes at a temperature slightly above its liquefaction temperature through a pipe 101 into the scrubbing tower 102. Acetone which is pre-cooled to the scrubbing temperature enters the scrubbing tower 102 at inlet 103, several trays below the topmost tray, and is dissolved in liquid ethylene which has been expanded in a valve 104 and supplied at 105 to the head of the scrubbing tower 102. The scrubbing solution is formed at 103 in the scrubbing tower.

The mixing heat liberated in this operation is relatively unimportant and is compensated for by the fact that a small quantity of $C_2H_4$ is evaporated. Therefore the heat of the mixture does not disturb the scrubbing operation taking place on the trays below 103. The temperature drop can spontaneously assume there the most advantageous course for the scrubbing operation. The $C_2H_2$ is scrubbed out at the liquefaction temperature of the $C_2H_2$—$C_2H_4$—$C_2H_6$ mixture determined by the scrubbing tower pressure. On the trays situated above 103 gaseous acetone carried along by $C_2H_4$ and $C_2H_6$ is scrubbed out and conveyed downwards into the actual scrubbing tower. The purified $C_2H_4$—$C_2H_6$ mixture leaves the scrubbing tower 102 through the pipe 106 and enters the separating column 108 at 107. Here the mixture is decomposed into gaseous $C_2H_4$ which is drawn off through a pipe 109, and liquid $C_2H_6$ which is discharged through a pipe 110. At the head of the separating column 108, liquid ethylene is fed in at 111 as a scrubbing liquid, which has been taken as a decomposition product from a pipe 109, compressed in a compressor 112, cooled in a heat-exchanger 113 in counter-current with itself, liquefied in a heat-exchanger 114 at the bottom of a separating column 108, and expanded in a valve 115. The gaseous $C_2H_4$ is drawn off as product through the pipe 109.

Figure 4:
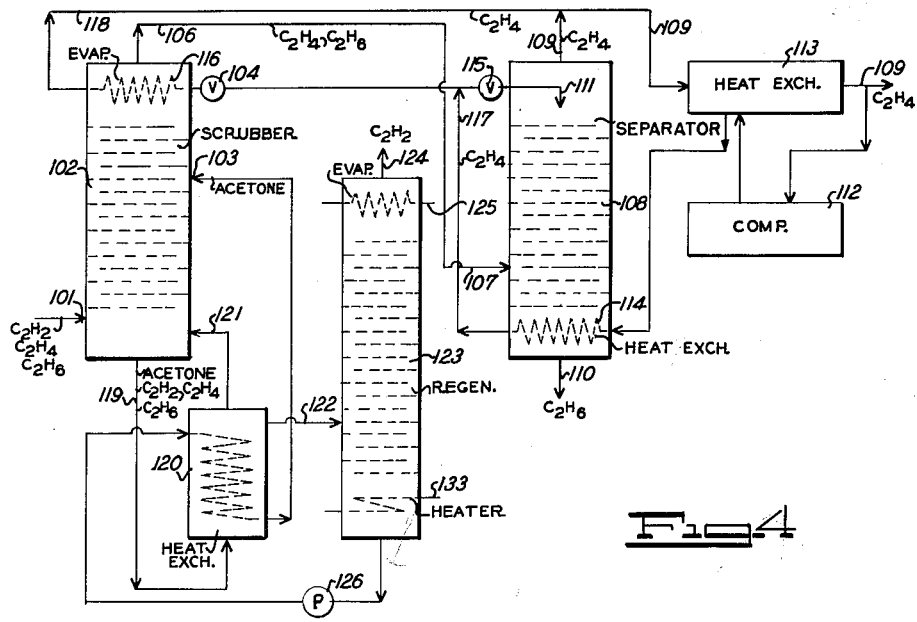
FIGURE 4 shows diagrammatically a modified form of the structure of FIGURE 3.

In the manner of operating according to FIGURE 4, ethylene and ethane are liquefied with the help of an extraneous cold source from the scrubbed gas mixture in the head of the scrubbing tower itself.

Liquid ethylene and ethane are formed on an evaporator 116 from the scrubbed gas in the head of the scrubbing tower 102. The evaporator 116 belongs to a compression refrigreating circuit operated with $C_2H_4$ but which of course can be operated with other refrigerating means. The refrigerant $C_2H_4$ is taken from the pipe 109 through which the pure $C_2H_4$ which is produced leaves the separator tower 108. The refrigerant is compressed in a compressor 112, flows in counter-current to itself through a heat-exchanger 113, passes the heat exchanger 114 at the bottom of separating column 108 and is expanded partly in a valve 115 into the separating column 108 and partly in a valve 104 into the evaporator 116. Through pipe 118 the refrigerant ethylene is returned to pipe 109. The liquefied $C_2H_4$—$C_2H_6$-mixture liquefied from the scrubbed gas flows over the topmost trays of the scrubbing tower 102, scrubbing out as it does so the acetone vapors entrained by the scrubbed gas, and is mixed with acetone at the acetone inlet point 103. Then, with this solution of acetone and liquid $C_2H_4$ and $C_2H_6$, the $C_2H_2$ is scrubbed from the $C_2H_2$—$C_2H_4$—$C_2H_6$-mixture on the trays below the inlet point 103 in the scrubbing tower 102. The scrubbing operation constitutes an extractive rectification. When the $C_2H_2$ is dissolved in the scrubbing solution, heat is produced which is compensated for by the fact that a corresponding quantity of $C_2H_4$ and $C_2H_6$ is evaporated from the solution.

The manner in which the cold scrubbing solution that is charged with $C_2H_4$ and $C_2H_6$ collects at the bottom of the scrubbing tower 102 and flows out through pipe 119, is regenerated is common to the two methods of operation illustrated in FIGURES 3 and 4. This solution flows in counter-current to warm, regenerated acetone through a heat-exchanger 120, where the $C_2H_4$ and $C_2H_6$ dissolved in the solution are liberated except for the proportion which is still soluble at the outlet temperature, and travels back through a pipe 121 to the bottom of the scrubbing tower. The acetone still charged with $C_2H_2$ and a small quantity of $C_2H_4$ and $C_2H_6$ passes through a pipe 122 into a regeneration column 123 provided at its base with a heating spiral 133 through which hot steam is arranged to flow. In this column, the dissolved $C_2H_2$ and the residual $C_2H_4$ and $C_2H_6$ are driven out and leave the column 123 through a pipe 124, after actone vapors have been condensed out with the help of an evaporator 125 which belongs to a separate refrigerating circuit that is not illustrated. The regenerated acetone collecting at the foot of the regeneration column 123 is delivered by means of the circulating pump 126, through the heat-exchanger 120 where it is cooled, into the scrubbing tower 102 at 103.

The temperature at which the gas mixture which enters the scrubbing tower 102 at 111 is scrubbed, depends on the pressure at which scrubbing is carried out, and on the composition of the gas. However, the scrubbing should always be carried out at, or slightly above, the liquefaction temperature of the mixture.

A gas mixture with 1% $C_2H_2$, 39% $C_2H_6$ and 60% $C_2H_4$ is, for example, to be freed of $C_2H_2$ by scrubbing with acetone. At the point of the decomposition process at which scrubbing is to be carried out, the gas has a pressure of 1.5 atmospheres absolute pressure. The liquefaction temperature of the mixture amounts to $-88°$ C. The scrubbing operation is carried out at this temperature of a few degrees, e.g. 5 degrees above the liquefaction temperature. Another mixture has, for example, the composition 1% $C_2H_2$ and 99% $C_2H_4$. The scrubbing process is to be carried out at 5 atmospheres absolute. The liquefaction temperature of this last mixture is minus 72° C. In this case, the scrubbing temperature chosen is $-67°$ C. The scrubbing temperatures mentioned are mean temperatures. A temperature drop determined by the scrubbing operation prevails in the scrubbing tower. The temperature at the head of the tower is nearer to the liquefaction temperature of the gas mixture to be scrubbed than is the temperature at the bottom of the column. Although, in the above examples, acetone is employed, the other mentioned solvents may also be employed.

There will now be obvious, to those skilled in the art, many modifications of the material described above. These modifications are, however, within the scope of the invention if defined by the following claims.

What is claimed is:

1. A process for the production of acetylene-free ethylene from a gas mixture containing low aliphatic hydrocarbons, comprising the steps of successively compressing the gas mixture, cooling the compressed gas mixture in counter-current with separation products obtained from said gas mixture, at least partially liquefying the cooled and compressed gas mixture thereby separating a $C_2$-mixture consisting of $C_2$-hydrocarbons only, introducing the $C_2$-mixture into a separating column to obtain ethane as sump liquid at the bottom and an ethylene-acetylene-mixture at the top of the separating column, introducing the ethylene-acetylene-mixture near the bottom and acetone of scrubbing temperature a determinable distance below the top into an acetone scrubbing column to obtain a pure ethylene product in the top of the acetone scrubbing column, withdrawing an acetylene and ethylene containing acetone solution from the bottom of the acetone scrubbing column, liberating dissolved ethylene from the solution by heat exchange with warm regenerated acetone and returning the liberated ethylene to the acetone scrubbing column, regenerating the resulting acetone solution in an acetone regenerating column to remove the acetylene, returning the regenerated acetone after heat exchange with cold acetylene and ethylene containing acetone to the acetone scrubbing column, withdrawing part of the ethylene product obtained in the top of the acetone scrubbing column, compressing said part of ethylene, cooling it in counter-current heat exchange with the ethylene product, liquefying it in a condensator-evaporator in the bottom of the separating column to heat the sump liquid of said column, dividing the liquefied ethylene and expanding the first part of it into the top of the separating column as a reflux liquid and expanding the second part of it into the top of the acetone scrubbing column as a reflux liquid.

2. A process for the production of acetylene-free ethylene from a gas mixture containing low aliphatic hydrocarbons, comprising the steps of successively compressing the gas mixture, cooling the compressed gas mixture in counter-current with separation products obtained from said gas mixture, at least partially liquefying the cooled and compressed gas mixture thereby separating a $C_2$-mixture consisting of $C_2$-hydrocarbons only, introducing the $C_2$-mixture into a separating column to obtain ethane as a sump liquid at the bottom and an ethylene-acetylene-mixture at the top of the separating column, introducing the ethylene-acetylene-mixture near the bottom and acetone of scrubbing temperature a determinable distance below the top into an acetone scrubbing column to obtain a pure ethylene product in the top of the acetone scrubbing column, withdrawing an acetylene and ethylene containing acetone solution from the bottom of the acetone scrubbing column, liberating dissolved ethylene from the solution by heat exchange with warm regenerated acetone and returning the liberated ethylene to the acetone scrubbing column, regenerating the resulting acetone solution in an acetone regenerating column to remove the acetylene, returning the regenerating acetone after heat exchange with cold acetylene and ethylene containing acetone to the acetone scrubbing column, withdrawing part of the ethylene product obtained in the top of the acetone scrubbing column, compressing said part of ethylene, cooling it in counter-current heat exchange with the withdrawn part of the ethylene product, liquefying it in a condensator-evaporator in the bottom of the separating column to heat the sump liquid of said column, dividing the liquefied ethylene and expanding the first part of it into the top of the separating column as a reflux liquid and expanding the second part of it into a condensator-evaporator situated in the top of the acetone scrubbing column to liquefy part of the ethylene ascending in the acetone scrubbing column, and introducing the expanded second part of ethylene into the ethylene product from the scrubbing column.

3. A process for the production of acetylene-free ethylene from a gas mixture containing low aliphatic hydrocarbons, comprising the steps of successively compressing the gas mixture, cooling the compressed gas mixture in counter-current with separation products obtained from said gas mixture, at least partially liquefying the cooled and compressed gas mixture thereby separating a $C_2$-mixture consisting of $C_2$-hydrocarbons only, introducing the $C_2$-mixture into an acetone scrubbing column, scrubbing it with acetone of scrubbing temperature to obtain a mixture of ethane and ethylene at the top and an acetone solution containing acetylene and ethylene and ethane at the bottom of the acetone scrubbing column, liberating dissolved ethylene and ethane from the acetone solution by heat exchange with warm regenerated acetone and returning the liberated ethylene and ethane to the acetone scrubbing column, regenerating the resulting acetone solution in an acetone regenerating column to remove the acetylene, returning the regenerated acetone after heat exchange with cold acetylene and ethylene and ethane containing acetone to the acetone scrubbing column, introducing the ethylene-ethae-mixture from the top of the acetone scrubbing column into a separating column to obtain ethane as sump liquid on the bottom and pure ethylene on the top of the separating column, withdrawing part of the pure ethylene, compressing it and cooling it in counter-current heat exchange with pure ethylene from the separating column, liquefying the compressed and cooled ethylene in a condensator-evaporator situated in the bottom of the separating column to heat the sump liquid of said column, dividing the liquefied ethylene, expanding the first part into a condensator-evaporator situated in the top of the acetone scrubbing column to liquefy part of the ethylene ascending in the acetone scrubbing column, introducing the expanded ethylene into the ethylene product from the separating column and expanding the second part into the top of the separating column as a reflux liquid.

4. A process for the production of acetylene-free ethylene from a gas mixture containing low aliphatic hydrocarbons, comprising the steps of successively compressing the gas mixture, cooling the compressed gas mixture in counter-current with separation products obtained from said gas mixture, at least partially liquefying the cooled and compressed gas mixture thereby separating a $C_2$-mixture consisting of $C_2$-hydrocarbons only, and removing ethane and acetylene from said $C_2$-mixture by rectifying said $C_2$-mixture to remove the ethane and scrubbing out the acetylene with a solvent at a temperature not lower than but close to the liquefaction temperature of the mixture from which the acetylene is to be scrubbed out, the cold energy for separating the $C_2$-mixture in said rectifying and scrubbing steps being provided by an ethylene circuit.

5. A process as claimed in claim 4 wherein the ethane is removed from the $C_2$-mixture before the acetylene.

6. A process as claimed in claim 4 wherein the acetylene is removed from the $C_2$-mixture before the ethane.

7. A process as claimed in claim 4 wherein the solvent is acetone.

8. A process as claimed in claim 4 wherein the solvent is selected from the group consisting of acetone, alcohols, amines and esters of lower organic acids.

9. A process as claimed in claim 4 further comprising liquefying a part of the ethylene and using it as a reflux in the scrubbing and rectifying.

10. A process as claimed in claim 4 further comprising liquefying part of the ethylene and using it for producing reflux in the scrubbing and liquefying.

11. A process as claimed in claim 4 further comprising producing reflux by condensing scrubbed gas by means of an indirect heat exchange with a cold medium.

12. A process as claimed in claim 11 wherein the cold medium is a liquid vaporized by heat exchange with the scrubbed gas.

13. A process for the production of acetylene-free ethylene from a gas mixture containing low aliphatic hydrocarbons, comprising the steps of successively compressing the gas mixture, cooling the compressed gas mixture in counter-current with separation products obtained from said gas mixture, at least partially liquefying the cooled and compressed gas mixture thereby separating a $C_2$-mixture consisting of $C_2$-hydrocarbons only, and removing ethane and acetylene from said $C_2$-mixture by rectifying said $C_2$-mixture to remove the ethane and scrubbing out the acetylene at a pressure of 1–5 atmospheres with a solvent at a temperature not lower than but close to the liquefaction temperature of the mixture from which the acetylene is to be scrubbed out, the cold energy for separating the $C_2$-mixture in said rectifying and scrubbing steps being provided by an ethylene circuit.

14. A process for the production of acetylene-free ethylene from a gas mixture containing low aliphatic hydrocarbons, comprising the steps of successively compressing the gas mixture, cooling the compressed gas mixture in counter-current with separation products obtained from said gas mixture, at least partially liquefying the cooled and compressed gas mixture thereby separating a $C_2$-mixture consisting of $C_2$-hydrocarbons only, introducing the $C_2$-mixture into an acetone scrubbing column, scrubbing it with acetone at a scrubbing temperature to obtain a mixture of ethane and ethylene at the top and an acetone solution containing acetylene and ethylene and ethane at the bottom of the acetone scrubbing column, liberating dissolved ethylene and ethane from the acetone solution by heat exchange with warm regenerated acetone and returning the liberated ethylene and ethane to the acetone scrubbing column, regenerating the resulting acetone solution in an acetone regenerating column to remove the acetylene, returning the regenerated acetone after heat exchange with cold acetylene and ethylene and ethane containing acetone to the acetone scrubbing column, introducing the ethylene-ethane-mixture from the top of the acetone scrubbing column into a separating column to obtain ethane as sump liquid on the bottom and pure ethylene on the top of the separating column, withdrawing part of the pure ethylene, compressing it and cooling it in counter-current heat exchange with pure ethylene from the separating column, liquefying the compressed and cooled ethylene in a condensator-evaporator situated in the bottom of the separating column to heat the sump liquid of said column, dividing the liquefied ethylene and expanding the first part into the top of the acetone scrubbing column and the second part into the top of the separating column as a reflux liquid.

References Cited in the file of this patent
UNITED STATES PATENTS

| 2,236,964 | Babcock | Apr. 1, 1941 |
|---|---|---|
| 2,236,965 | Babcock | Apr. 1, 1941 |
| 2,596,785 | Nelly et al. | May 13, 1952 |
| 2,804,488 | Cobb | Aug. 27, 1957 |
| 2,849,396 | Nelson | Aug. 26, 1958 |
| 2,909,038 | Williams | Oct. 20, 1959 |
| 2,915,881 | Irvine | Dec. 8, 1959 |